(12) United States Patent
Lagares Corominas

(10) Patent No.: US 7,077,057 B1
(45) Date of Patent: Jul. 18, 2006

(54) PLANT FOR CONTINUOUS PROCESSING AND PACKING OF MEAT PRODUCTS AND METHOD FOR THE IMPLEMENTATION THEREOF

(75) Inventor: Narcís Lagares Corominas, Girona (ES)

(73) Assignee: Metalquimia, S.A. (ES)

( * ) Notice: Subject to any disclaimer, the term of this patent is extended or adjusted under 35 U.S.C. 154(b) by 0 days.

(21) Appl. No.: 10/204,722

(22) PCT Filed: Feb. 22, 2000

(86) PCT No.: PCT/ES00/00061

§ 371 (c)(1),
(2), (4) Date: Mar. 4, 2003

(87) PCT Pub. No.: WO01/62096

PCT Pub. Date: Aug. 30, 2001

(51) Int. Cl.
*A23L 1/31* (2006.01)

(52) U.S. Cl. .......................................... 99/532; 99/535

(58) Field of Classification Search ................... 99/487, 99/532–535, 516, 472, 486, 494, 356; 366/44, 366/45, 185; 452/233, 141; 100/910; 426/392, 426/412, 414
See application file for complete search history.

(56) References Cited

U.S. PATENT DOCUMENTS

| | | | | | |
|---|---|---|---|---|---|
| 4,520,718 | A | * | 6/1985 | Prosenbauer | 99/535 |
| 4,620,478 | A | * | 11/1986 | Corominas | 99/533 |
| 4,791,705 | A | | 12/1988 | Corominas | 17/25 |
| 5,269,216 | A | * | 12/1993 | Corominas | 99/356 |
| 5,307,737 | A | * | 5/1994 | Higashimoto | 99/533 |
| 5,323,694 | A | * | 6/1994 | Higashimoto | 99/535 |
| 5,972,398 | A | * | 10/1999 | Ludwig et al. | 426/281 |
| 6,595,846 | B1 | * | 7/2003 | Lagares Corominas | 452/141 |

FOREIGN PATENT DOCUMENTS

EP  0 455 611 A1  11/1991
EP  0 575 024 A1  12/1993

* cited by examiner

*Primary Examiner*—Timothy F. Simone
(74) *Attorney, Agent, or Firm*—Black Lowe & Graham PLLC

(57) ABSTRACT

A method and apparatus for a meat processing plant includes an injecting station (10) for injecting meats with brine, a macerating station (20) for massaging the injected meat including movable, plural resting tasks (24) and means (26) for moving these tables with respect to an accumulating and loading station (40) for repeated processing of the injected mean in a rotating drum (22) of the macerating station (20). A packing station (30) can accept treated meat from the resting tanks (24) for final packing in one or more packing machines (32). The method and apparatus can continuously process one or more types of meat products without interruption.

11 Claims, 6 Drawing Sheets

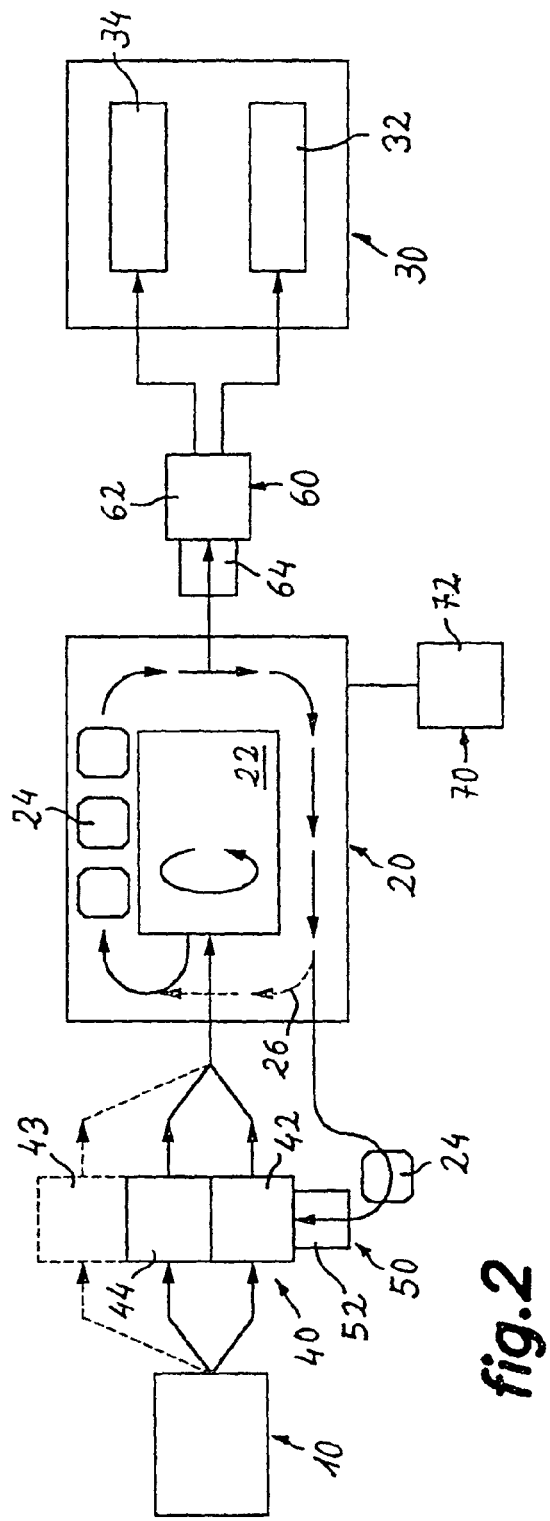
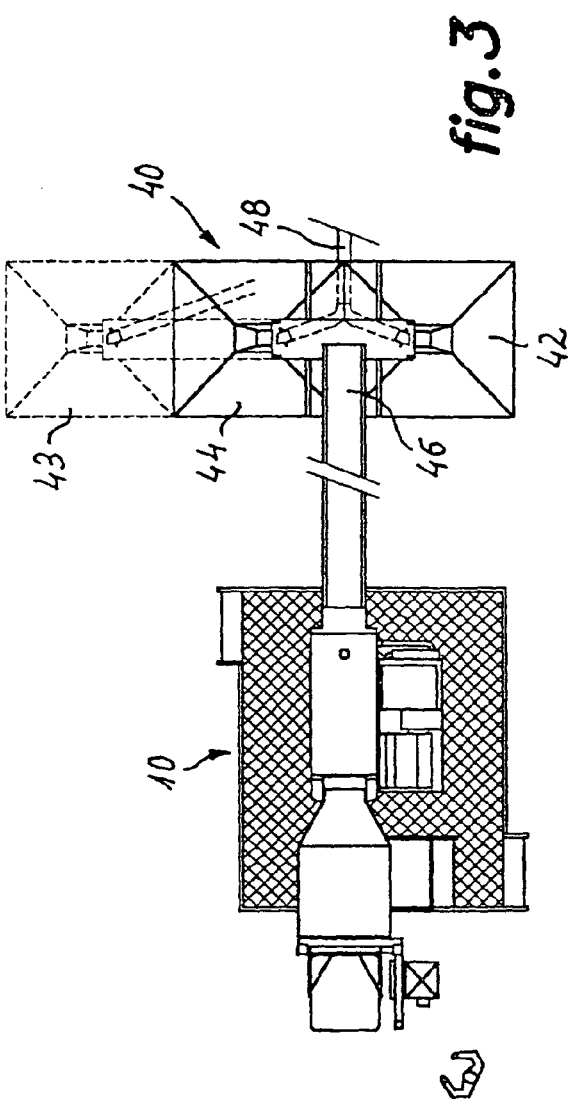
fig.2
fig.3

PLANT FOR CONTINUOUS PROCESSING AND PACKING OF MEAT PRODUCTS AND METHOD FOR THE IMPLEMENTATION THEREOF

CROSS-REFERENCE TO RELATED APPLICATIONS

This non-provisional application is the U.S. National Stage of PCT Application PCT/ES00/00061 which has an international filing date of Feb. 22, 2000, and claims priority from that PCT Application.

FIELD OF THE ART

This invention relates to a plant for nonstop treating and packing meat materials, namely for treating and packing medium sized meat material designed to products such as cooked ham, roast beef, corned beef, whole fowls or certain fowl or pork sausages. Said treatment includes a step of injecting brine to said meat material, one or more steps of massage matched with one or more steps of rest and one step of packing, for example, by stuffing or thermoforming. This invention also relates to a process for nonstop treating and packing meat material.

BACKGROUND OF THE INVENTION

In the state of the art, apparatuses for injecting brine to meat materials are well-known, units for carrying out one or more massage-rest consecutive treatments having a predetermined duration and packing machines which include stuffing machines, stapling machines, dosing machines, thermoforming machines and the like, by means of which plants for treating and packing meat material are installed. Document U.S. Pat. No. 4,791,705, granted to this applicant, discloses a machine for treating and macerating meat, that is to say, for submitting the meat material to massage-rest consecutive treatments, provided with automatic loading and unloading and provided with a computer centralized control, marketed by Metalquimia, S.A. with the brand Thermocomputer. Said machine includes a rotatory drum which has at an axial end a loading-unloading mouth provided with a door with adjusting and closing devices. The drum is supported and guided by a frame, which is hinged at one end with respect to a part of the fixed structure, so that the frame, and with it the drum, can adopt an inclined position towards one or the other side or keep an horizontal position. A moving structure surrounds the drum, said structure being provided with a step-by-step travel on which a series of containers are mounted for pieces of meat material. In front of said drum loading-unloading mouth there is a loading device capable to turn a load contained in a container down a hopper arranged to load the drum. For unloading the drum there exists means for lifting the rear part thereof so that its contents is unloaded through the loading-unloading mouth within an empty container submitted to weigh control.

Most of these machines are capable of a nonstop operation. However, the meat material produced by a machine must be accumulated within containers which are hand moved or by means of mechanical trucks up to the following machine for feeding it, for which a great number of operators and a large space for containers travels are required. The different machines have different production capabilities and in addition they must be thoroughly cleaned each given number of cycles or working hours, or when starting the treatment of a new type of meat material the conditions of which are incompatible with those of the preceding one, therefore frequently it happens that an excess of meat material is accumulated from a machine because of a temporary incapability of the following one for admitting it, or that a machine must stay stopped because of a temporary incapability of production of the preceding machine. This produces loss of productivity in the plant and in addition it obliges to a complex and expensive programming of the times of production of the different units and of accumulation and travel of containers of semifinished meat material between them.

Therefore, an object of this invention is to contribute with a plant for treating and packing meat material in which the different units are coupled to each other for a nonstop operation, linked by units for accumulating, loading, unloading and/or feeding semifinished meat material and in which every unit is controlled and coordinated by central control electronic means.

Another object of the invention is to contribute with a plant for nonstop treating and packing meat material in which the operating cycles of the different units are controlled and coordinated so that times for cleaning each unit are available while at least one of the remaining units is operating.

SHORT EXPLANATION OF THE INVENTION

These objects are achieved according to this invention by contributing with a plant for nonstop treating and packing meat material comprising:

a station for injecting brine to the meat material;

a station for macerating including at least a rotatory drum for massaging injected meat material and a plurality of resting tanks for massaged meat material which can travel step-by-step along a closed path around said rotatory drum, which is at least one, prepared for receiving said meat material from the rotatory drum and keeping it resting up to the moment of emptying it; and a station for packing the treated meat material; said stations being coupled to each other for nonstop operation, linked by:

a unit for accumulating and loading the rotatory drum, located between the outlet of said injecting station and the inlet of said macerating station; and a unit for transferring and feeding, located between a given point of said path and said packing station, the steps of operation of the different stations and units being coordinated from at least one computer control centre so that at any moment of an operation cycle of the plant, at least one of the stations is operating, a time for cleaning each station, unit or part thereof being provided during said cycle, keeping the plant nonstop operation.

The plant also comprises a reloading unit including means for newly transferring massaged-rested meat material from said resting tanks to said massaging drum so that said meat material can be submitted to repeated massing-resting subcycles before it is fed to the packing station.

Optionally, the plant in addition includes an automatic cleaning unit for the resting tanks located at a point of said closed path.

With said arrangement, the plant operation cycle starts at the injecting station, which preferably comprises a conventional nonstop injecting machine, such as a multineedle injecting machine with spraying effect Movistick of Metalquimia S.A., Girona, Spain. The injected meat material is transferred by carrying means to the accumulating and loading unit, located adjacent to a loading-unloading mouth of said rotatory drum. Said accumulating and loading unit has two or more hoppers and means for distributing the meat material so that it alternately fills one hopper when the other is being emptied and its contents is loaded in the rotary drum to be submitted to a massage treatment, which typically comprises a knock and friction action of the pieces of meat material with each other and against the drum walls matched with a pulmonary action or alternate cycles of atmospheric pressure and vacuum at a given temperature. Advantageously, the capability of each of the hoppers of the accumulating and loading unit corresponds to the loading and treatment capability of the rotatory drum.

Once a massaging operation of a load within the rotatory drum is completed, the massaged pieces of meat material are transferred from the drum to one or more of said resting tanks where said pieces rest during a suitable period of time, during which time said tank or tanks, together with the remaining ones, are moved step-by-step along said path. Immediately after unloading the drum contents in respective tanks, the drum is newly filled with a new load. The transfer of meat material from the loading hoppers to the drum is carried out through high vacuum sucking. The arrangement and operation of the macerating station is similar to the one disclosed in said document U.S. Pat. No. 4,791,705.

When all the tanks are filled with pieces of meat material submitted to a first massaging action, the injecting station stops and, after a given time of rest, if no further macerating actions are required, a sequential transfer of the load is started from the resting tanks to a feeding hopper of one or more packing machines at a packing station. The most usual packing machines are a nonstop stuffing machine, as for example the Twinvac of Metalquimia S.A. matched with an automatic stapling machine or a dosing machine matched with a thermoforming machine. The means for transferring the contents of the resting tanks to the different hoppers are lifting-tilting machines, such as for example the hydraulic lifting-tilting machine Alpha of Metalquimia S.A.

However, usually it is required that the pieces of meat material are submitted to several repeated proceedings of massaging-resting before their packing, for which the loads having rested in the tanks must be newly transferred to the rotatory drum for a further massaging action and thereafter they must be newly loaded in the resting tanks for a new period of rest, and this subcycle can be repeated if required, several times within the plant general treatment cycle. For this purpose, at a point of the path adjacent to the accumulating and loading unit, there is said reloading unit located, which takes a full tank, lifts it and turns its contents down one of the hoppers of the accumulating and loading unit, which in that moment is empty, and in the event that a load of the drum occupies more than one resting tank, said operation is repeated until the whole load distributed in several tanks has been transferred to said hopper, from which said load is newly transferred to the drum, where it is submitted to a new massage, after which the load is newly emptied in respective resting tanks, which remained empty during the massaging operation, while the following load in turn has been or is being transferred to the loading hopper and so on until completing one or more massaging-resting subcycles for every load. When the last massaging-resting subcycle is completed, with every resting tank filled and the drum empty, the packing step is started in an analogous way as above disclosed.

When the injecting step ends, the injecting machine stops and it can be thoroughly cleaned together with the parts of the accumulating and loading unit which are idle while the macerating station is operating. When the last massaging action of the last load of an operation cycle is completed it can be proceeded to a thorough cleaning of the rotatory drum which has available an automatic cleaning device, and of those parts of the accumulating and loading unit which were not previously cleaned and thereafter a new cycle can be started with the injection of new loads, while the transferring and feeding unit goes on feeding the packing station, which is in full production.

As the resting tanks are remaining empty, after their contents has been turned down the feeding hopper of the packing station, said tanks can be thoroughly cleaned in said automatic cleaning unit located in the path the tanks follow downstream under said transferring and feeding unit, remaining available to be filled with the massaged meat material loads, from the rotatory drum, of the new cycle. This is very important because it makes that the plant of this invention is capable to carry out consecutive cycles treating different types of meat material, eventually incompatible with each other, or even to process loads of said different types of meat material within a same cycle, proceeding to due cleaning between cycles or loads.

When the meat material packing step corresponding to the first cycle is completed, the packing machines stop and it can be proceeded to thoroughly clean them as well as their corresponding feeding hopper and elements associated to them while the injecting station, the accumulating and loading unit and the macerating station are newly operating within the following cycle.

SHORT DESCRIPTION OF THE DRAWINGS

This invention is illustrated thereafter by means of a detailed description of preferred examples of embodiment with reference to the appended drawings, in which:

FIG. 2 is a flow chart which illustrates the flows of meat material in a plant of this invention;

FIGS. 3 to 5 are plan enlarged part views of a plant according to a second example of embodiment of this invention.

DETAILED DESCRIPTION OF EXAMPLES OF PREFERRED EMBODIMENTS

Figure 1:
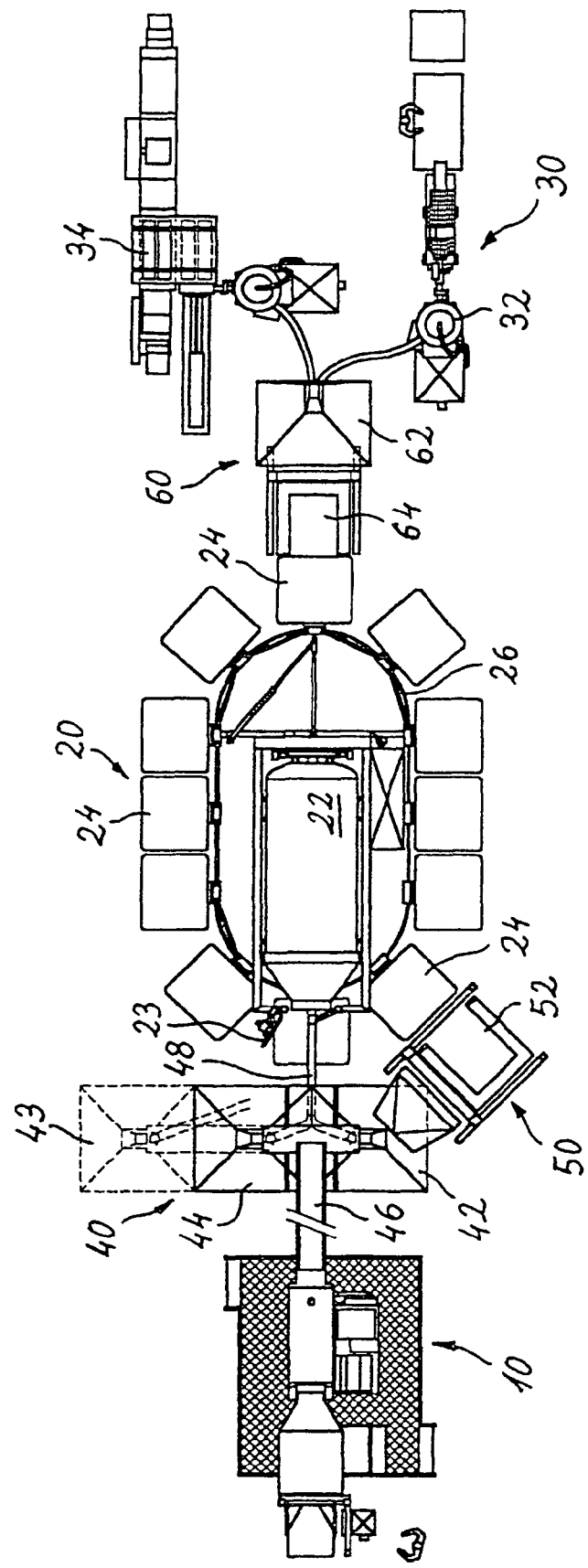
FIG. 1 is a schematic plan view of a plant for nonstop treating and packing meat material according to a first example of embodiment of this invention.

Referring first to FIG. 1, the plant of this invention comprises an injecting station 10 of brine to the meat material; a macerating station 20 including at least a rotatory drum 22 for massaging the injected meat material and a plurality of resting tanks 24 for the massaged meat material which can travel step-by-step along a closed path 26 around said rotatory drum 22, which is at least one, prepared for receiving meat material from said drum 22 and keep it resting until the moment of its emptying; and a packing station 30 for the treated meat material. Stations 10, 20, 30 are coupled to each other for a nonstop operation, linked by an accumulating and loading unit 40 to the rotatory drum 22, located between the outlet of said injecting station 10 and the inlet of said macerating station 20; and a transferring and feeding station 60, located between a given point of said path 26 of the macerating station 20 and said packing station 30.

The operating steps of the different stations 10, 20, 30 and units 40, 60 are coordinated from at least a computer control centre (not shown), so that at any moment of an operation cycle of the plant at least one of the stations 10, 20, 30 is operating, a time for cleaning each of the stations 10, 20, 30, unit 40, 60 or part thereof is provided during said cycle. The complete process for nonstop treating and packing meat material will be described with more details below with reference to FIGS. 6 and 7.

Advantageously, the plant comprises in addition a reloading unit 50 integrated in said macerating station including means for newly transferring massaged-rested meat material from said resting tanks 24 to said rotatory drum 22, so that said meat material can be submitted to repeated subcycles of massaging-resting before it is fed to the packing station 30.

Said closed path 26 of the resting tanks 24 includes at least a first stopping area under a loading/unloading mouth 23 of the massaging rotatory drum 22, a second stopping area close to the transferring and feeding unit 60 and a third stopping area close to the said reloading unit 50. The resting tanks 24 are linked to dragging means in closed circuit along said path 26, being detachable from said dragging means at least in some of said stopping areas.

In order to be able of nonstop operating, said accumulating and loading unit 40 comprises at least a first hopper 42 and a second hopper 44, a transporting-distributing means 46 for alternately filling said first and second hoppers 42, 44 with injected meat material from the injection station 10 and a transferring means 48 for selective transference of the contents of the first and second hoppers 42, 44 to the rotary drum 22 of the maceration station, wherein the transferring means 48 comprises an aspiration conduction system by way of a vacuum pump.

In the event that a single massaging operation is required, followed by a single resting period of time for the meat material before it is fed to the transferring and feeding station 60, when all the tanks 24 are full, the injecting station 10 and the accumulating and loading unit 40 stop and it can be proceeded to their cleaning while the resting period of time of the meat material is completed in the resting tanks 24 and its feeding to the packing station 30 starts through the transferring and feeding unit 60.

If required, as it usually happens, that the meat material is submitted to repeated massaging-resting subcycles before it is fed to the packing station 30, said reloading unit 50 is used, as it was stated before, the means of which for transferring massaged-rested meat material from the resting tanks 24 to said massaging drum 22 comprise a lifting-tilting apparatus 52 capable to sequentially take each of the filled resting tanks 24, from said third stopping area of the path 26, for lifting them, turn their contents down said first hopper 42 of the accumulating and loading unit 40 and bringing them back, empty, to said third stopping area of the path 26. For this, said first hopper 42 of the accumulating and loading unit 40 must be empty, therefore the reloading operations start when all the resting tanks 24 are filled and the injecting station 10 stopped. This way, while reloading operations of the further massaging-resting subcycles are carried out, it can be proceeded to cleaning the injecting station 10 and the second hopper 44 and carrying-distributing means 46 of the accumulating and loading unit 40.

When said further massaging-resting subcycles are completed it is proceeded to feed the treated meat material to the packing station 30 through the transferring and feeding unit 60, which includes means for transferring massaged-rested meat material from said resting tanks 24 to at least a feeding hopper 62 from one or more packing machines 32, 34 of the packing station 30, the means of which typically comprise a lifting-tilting apparatus 64 capable of taking one of said resting tanks 24 filled from said second stopping area of the path 26, lifting it, turning it to transfer its contents down the feeding hopper 62 and bringing it back, empty, to said second stopping area of the path 26. The resting tanks 24, as they are remaining empty can be cleaned and ready for a new cycle.

The new cycle can start by injecting meat material at the injecting station 10 and filling the hoppers 42, 44 of the accumulating and loading unit 40, while the feeding tasks are carried out at the packing station 30 by means of the transferring and feeding unit 60, provided that the rotatory drum 22 is empty, and if required cleaned, when the contents of the first or the second hopper 42, 44, within the new cycle, must be loaded in said drum.

Last, the packing station 30 and the transferring and feeding unit 60 can be cleaned when the meat material packing of first cycle is completed and while the meat material of the new cycle is being injected and submitted to a first massaging-resting subcycle of the new cycle.

In FIG. 2 a plan flow chart is shown as above described, where the flows of the meat material are shown by means of arrows. In said diagram, an optional third hopper 43 is shown with a dot line, in the accumulating and loading unit 40 which serves to be able to simultaneously carry out the loading tasks of the rotary drum 22 with reloading tasks thereof with rested meat material from the resting tanks 24.

Figure 4:
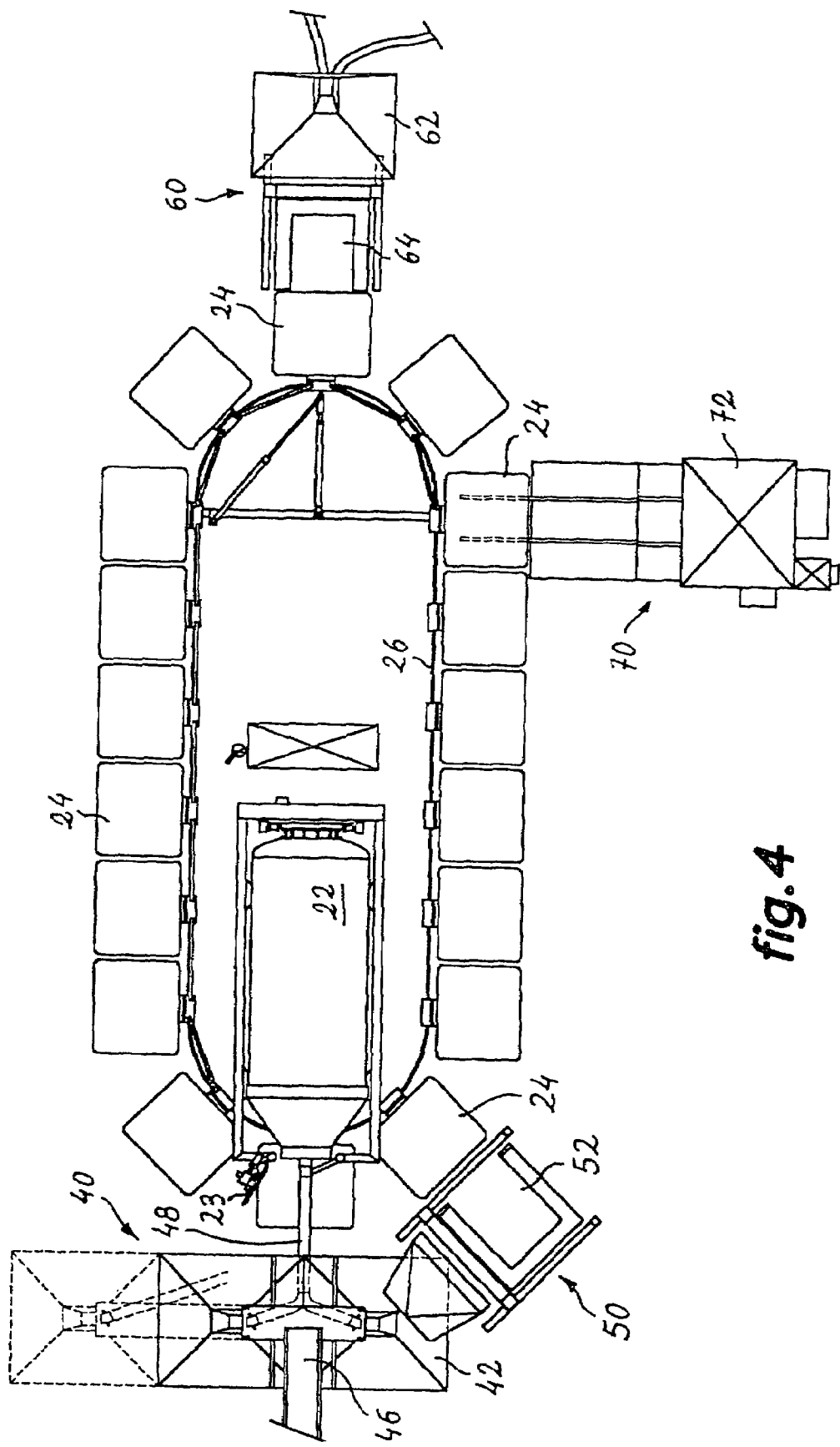
Figure 5:
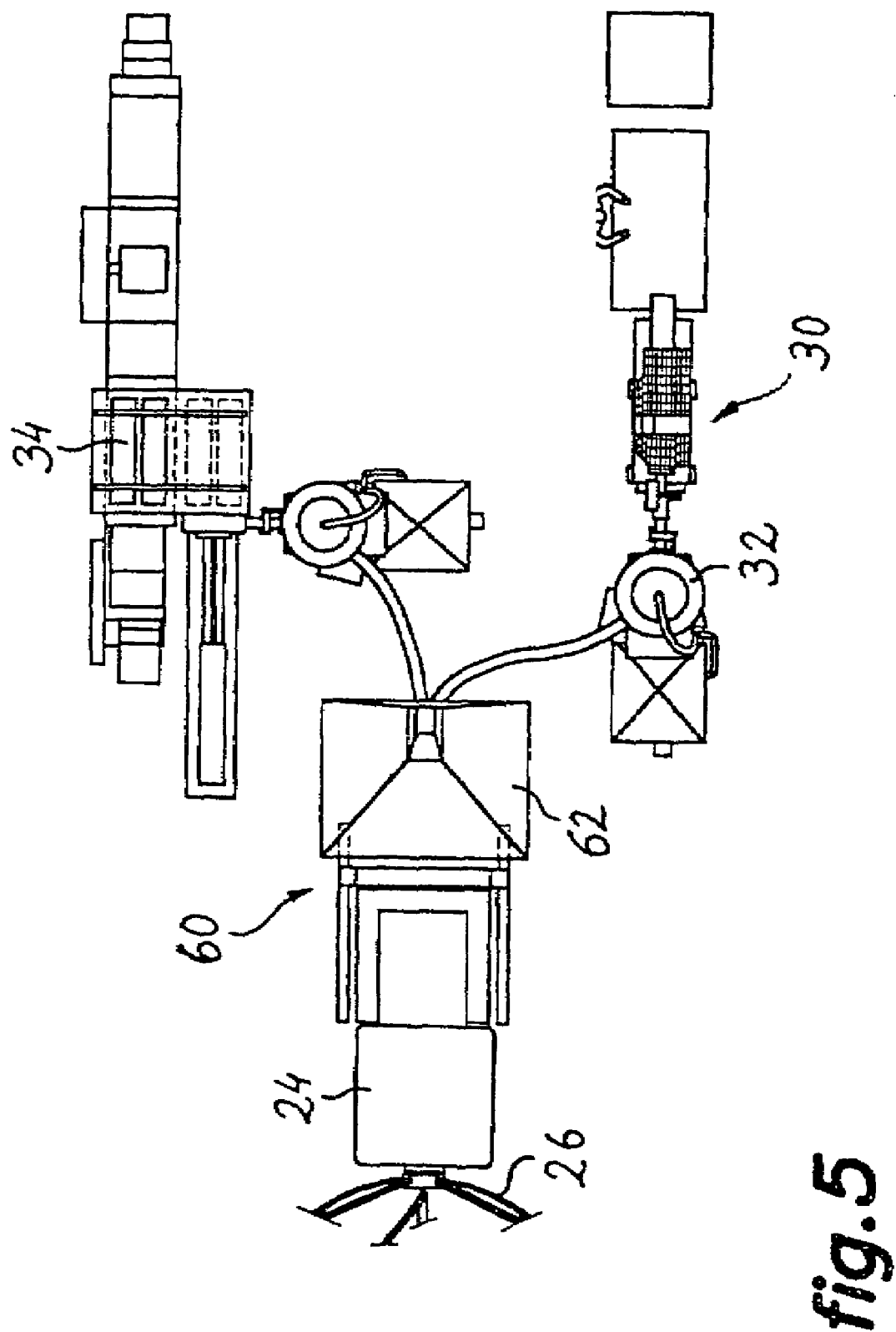

In FIGS. 3 to 5 a plant according to another example of embodiment of this invention is shown, which is fully similar to the one described with relation to FIG. 1 but with a higher capability of production, therefore identical numerals have been used for similar elements.

The plant of FIGS. 3 to 5 has a larger capability rotatory drum and a greater number of resting tanks 24 arranged in a longer path 26. Subsequently, the injecting station 10 and packing station 30 also have a larger capability of production and the hoppers 42, 44, 62 of the accumulating and loading unit 40 and the transferring and feeding units 60 are larger. However, for easy handling purpose, the capability of the tanks 24 of the plant of FIGS. 3 to 5 is similar to that of the tanks 24 of the plant of FIG. 1. Therefore, the contents of each massaged meat material load by rotatory drum 22 of FIGS. 3 to 5 is going to fill three resting tanks 24 instead of the two tanks which the rotatory drum load of FIG. 1 would fill. This is the reason why the plant of FIGS. 3 to 5 has a greater number of resting tanks 24, concretely eighteen, than the plant of FIG. 1, where there are only twelve. It is to be point out, however, that both plants include a respective number of resting tanks 24 equally corresponding to six loads of the rotatory drum 22. Obviously, the number of loads capable to be temporarily kept resting in the resting tanks 24 is variable depending on the number thereof available and related length of the path 26, and will depend on the characteristics of the facilities and the operation cycles it is wished to be established, according to different types of meat material to be treated or different end products to be obtained.

The plant of FIGS. 3 to 5 in addition includes an automatic cleaning unit 70 of the resting tanks 24 located at a point of the closed path 24 downstream said transferring and feeding unit 60. Said cleaning unit 70 includes means for taking one of said empty resting tanks 24 from a fourth stopping area of the path 26, to transfer it to an automatic cleaning device 72 and bringing it back once it is clean to said fourth stopping area of the path 26, ready for a new cycle. The rotatory drum 22 has also available a fully automated cleaning device, without requiring an operator to intervene. Other elements, such as hoppers 42, 44, 62, can also be provided with automatic cleaning devices provided that they meet the local standards of health.

Figure 6:
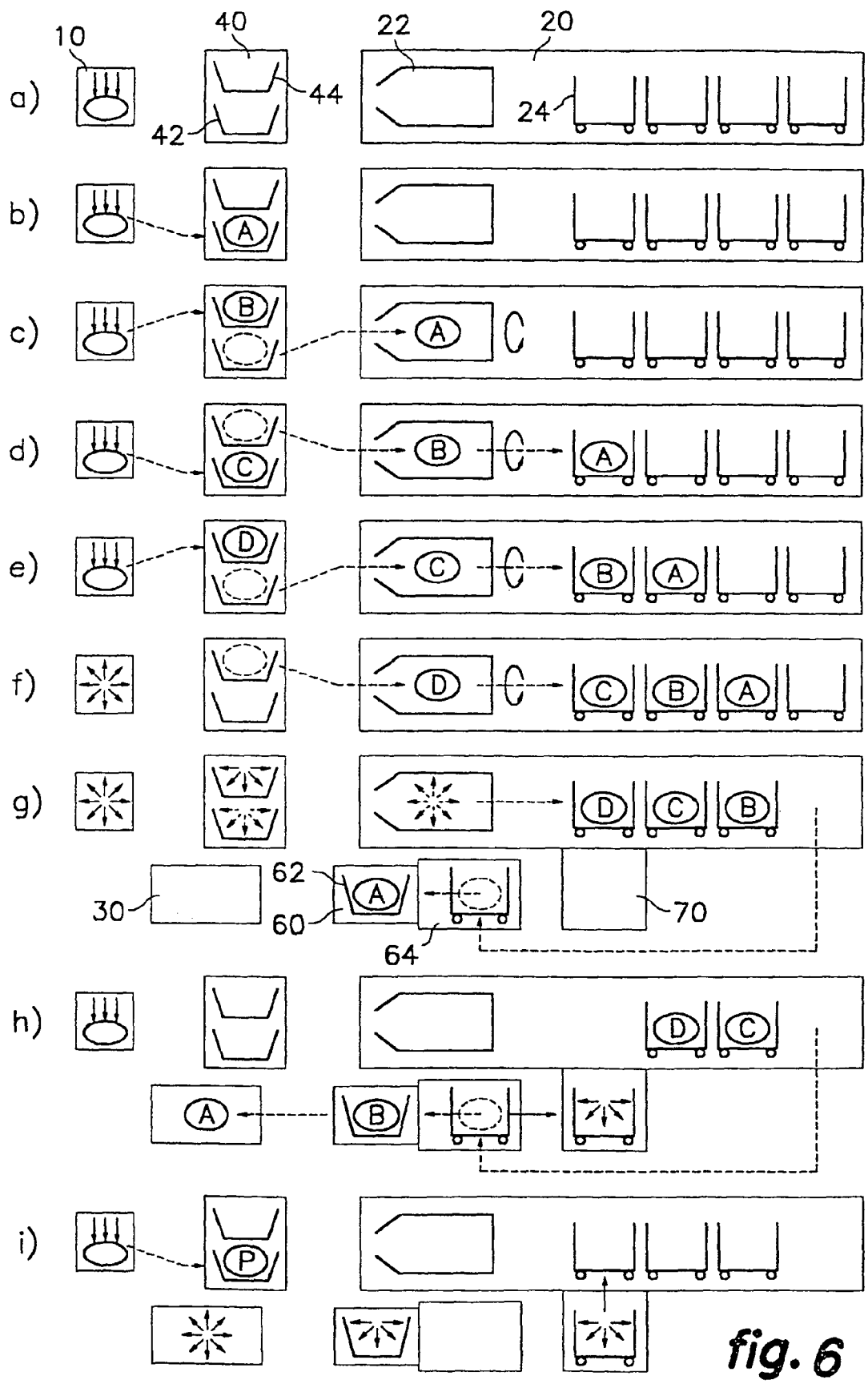
FIGS. 6 and 7 are schematic diagrams illustrating a process for nonstop treating and packing meat material which can be implemented with the plant of FIG. 1 or the plant of FIGS. 3 to 5.
Figure 7:
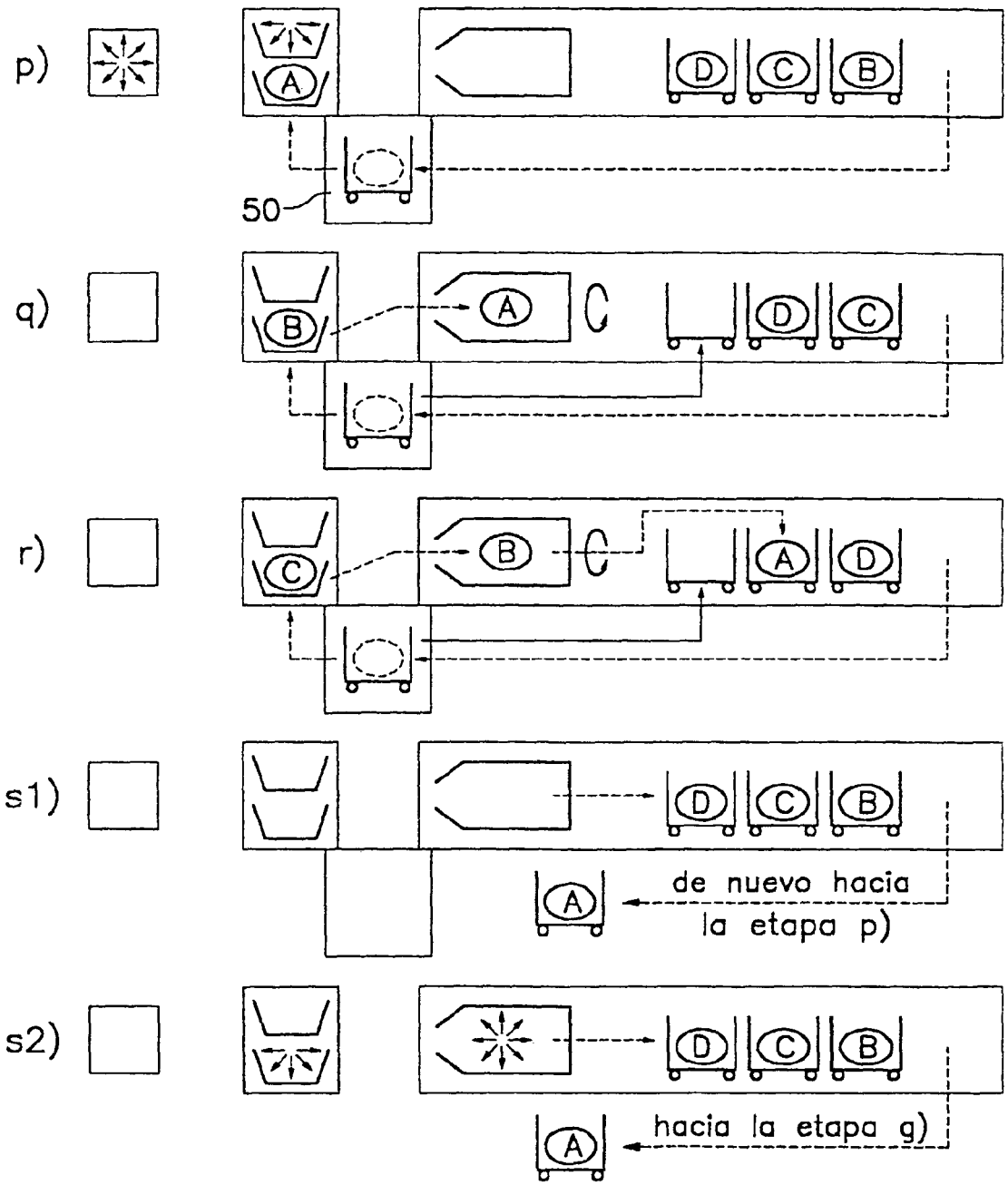

In FIGS. 6 and 7, schematic diagrams illustrate the steps of the process for nonstop treating and packing meat material of this invention. In this description, when the term "load" is used, it refers to an amount of meat material corresponding to the rotatory drum 22 loading and treating capability, each of said loads, depending on the size of the drum 22 with relation to the resting tanks 24 can occupy one, two, three or more of said resting tanks 24. It is important to point out to this respect, that in order the figures and following explanation are clearer and simpler, the process is shown in an example implemented in a plant similar to those illustrated in FIGS. 1 to 5 but simplified, with a rotatory drum 22 the load of which is capable to fill the single tank 24 and with only four loads of the drum 22, for each production cycle of the plant, therefore only four tanks 24 have been illustrated at the maceration station 20.

The process is characterized in that a series of operations and treatment are carried out, in a chained and automated way under a centralized control, using stations and operation units which are adjacent, linked, forming a production line of coordinated operation which can operate in a nonstop way, so that at any moment of a working cycle at least one of the stations is operating, and at least two different meat material loads are being simultaneously submitted to one of said operations or treatments, a time for cleaning each station, unit or part thereof being provided during said cycle.

FIG. 6 illustrates the process of this invention according to a basic cycle including a single massage-rest subcycle, which is composed of following steps:

a) injecting pieces of meat material with brine at an injecting station 10, with which for example, first cycle is started;

b) carrying pieces of injected meat material from preceding step a) for accumulating them in a first hopper 42 of an accumulating and loading unit 40 constituting a first load A;

c) carrying pieces of injected meat material from step a) for accumulating them in a second hopper 44 of said accumulating and loading unit 40, constituting a second load B while at same time said first load A is transferred from said first hopper 42 to a massaging rotatory drum 22 of a macerating station 20 and the first massaging action of the first load A starts.

d) carrying the pieces of injected meat material from the step a) for accumulating them in the first hopper 42 constituting a third load C while said first massaging action of the first load A is completed and said load is transferred from the rotatory drum 22 to one of the resting tanks 24 to submit the first load A to a first resting period of time and it is proceeded to transfer said second load B from said second hopper 42 to the rotatory drum 22 and a first massaging action of the second load B starts;

e) carrying pieces of injected meat material from the step a) for accumulating them in the second hopper 44 constituting a fourth load D while said first massaging action of the second load B is completed and said load is transferred from the rotatory drum 22 to another of the resting tanks 24 to submit the second load B to a first resting period of time and it is proceeded to transfer said third load C from the first hopper 42 to the rotatory drum 22 and the first massaging action of the third load C starts, f) stopping the injecting station 10 and proceeding, if required, to its cleaning (illustrated by means of divergent arrows) while said first massaging action of the third load C is completed and is transferred from the rotatory drum 22 to another of the resting tanks 24 for submitting the third load C to a first resting period of time and it is proceeded to transfer said fourth load D from the second hopper 44 to the rotatory drum 22 and a first massaging action of the fourth load D starts;

g) transferring the fourth load D, once its first massaging action is completed, from the rotatory drum 22 to the last (for example in this case 4) of the resting tanks 24 for submitting the fourth load D to a first resting period of time, with which there are no longer empty tanks 24, at which moment it can be proceeded, if required, to cleaning the accumulating and loading unit (40) and the rotatory drum (22) (the cleaning of which would be essential for preparing said elements for a second cycle with a kind of meat material incompatible with those of the first cycle), while with transferring means 64 of a transferring and feeding unit 60 the first massaged-rested load A corresponding to the resting tank 24 is transferred to a hopper 62 of said transferring and feeding unit 60, although said transfer could be carried out directly from the resting tank.

h) feeding the first load A from said hopper 62 to the packing station 30 while it is sequentially going on with the transfer of the remaining massaged-rested loads B, C, D, from the respective resting tanks 24 to said hopper 62, and it is sequentially proceeded to clean the tanks 24, as they are being emptied, for example, in an automatic cleaning unit 70 situated at a point of said closed path 26, at which moment a second cycle can be started with analogous steps to those of steps a) and following ones for constituting and treating loads P,Q,R,S of meat material within said second cycle; and i) cleaning the transferring and feeding unit 60 and the packing station 30 once the packing action of loads A, B, C, D of the first cycle is completed while it is proceeded with the injecting and macerating actions of said loads P, Q, R, S of the second cycle and so on.

In FIG. 7, steps p), q), r), s) are illustrated which are being intercalated between steps f) and g) of FIG. 6 in a very generalized case, in which more than one massaging-resting subcycle for each load before proceeding to the packing. Thus, between said steps f) and g) of FIG. 6, following steps are included:

p) transferring the first load A, which has been submitted to a first massaging action and to a first resting period of time, from the respective resting tank 24 to said first hopper 42 of the accumulating and loading unit 40 by means of reloading unit 50, while it is eventually going on cleaning the injecting station 10 and cleaning the second hopper 44, and related elements, of the accumulating and loading unit 40;

q) transferring the first load A from the first hopper 42 to the rotatory drum 22 and starting a second massaging action of the first load A and meanwhile transferring the second load B, which has been submitted to a first massaging action and to a first resting period of time, from the respective resting tank 24 to the first hopper 42;

r) transferring the first load A, once the second massaging action is completed, from the rotatory drum 22 to the respective resting tank 24 (the same which contained the load A during the first resting period of time and which remained empty during the second massaging action) for submitting it to a second resting period of time and thereafter loading the second load B from the first hopper 42 to the rotatory drum 22 and starting a second massaging action of the second load B;

and so on until every load A, B, C, D have been submitted to a second massaging-resting subcycle.

In the event that further massaging-resting subcycles are required, the following step is carried out:

s1) carrying out further subcycles of steps analogous to the steps p) to r) (without the cleaning operations) for submitting the loads A, B, C, D to further massaging actions and to further resting actions, after which it is proceeded with the step g) of FIG. 6.

In the event that two massaging-resting subcycles are sufficient, it is passed to the step:

s2) going on with the step g) while the cleaning of the first hopper 42 and related elements of the accumulating and loading unit 40 and the rotary drum 22 of the macerating station 20 is carried out.

As stated above, although the figures illustrate each meat material load occupying only one resting tank 24, usually each load occupies two (FIG. 1) or three (FIGS. 3 to 5) resting tanks 24 the contents of which as a whole can be treated in a single rotatory drum 22 load.

A man of the art of this sector can introduce multiple variations to the examples of embodiment illustrated in the figures and above described, which are quoted only for illustration purpose therefore they ought not be purported to limit the scope of the invention, which is defined in the appended claims. In particular, although FIGS. 1 to 4 show a linear arrangement plant, the different units and/or stations can be linked in any other arrangement, for example at 90°, zigzag, et.

The invention claimed is:

1. Plant for nonstop treating and packing meat material which comprises:
    an injecting station (10) for injecting brine to the meat material;
    a macerating station (20) including a rotatory drum (22) for massaging injected meat material and having a plurality of resting tanks (24) for injected, massaged meat material associated with carrying means for travelling said resting tanks (24) step-by-step along a closed path (26) around said rotatory drum (22), said resting tanks (24) being adapted for receiving injected, massaged meat material from said rotatory drum (22) and keeping it resting up to the moment of emptying it so as to become treated meat material; and
    a packing station (30) for packing the treated meat material;
    said stations being coupled to each other for nonstop operation, linked by:
    an accumulating and loading unit (40) for accumulating and loading the rotatory drum (22), located between an outlet of said injecting station (10) and an inlet of said macerating station (20); and
    a transferring and feeding unit (60) for transferring and feeding treated meat material at said packing station (30), located between a given point of said path (26) of said macerating station (20) and said packing station (30),
    wherein steps of operation of the stations (10, 20, 30) and the units (40, 60) are coordinated from at least one computer control center so that at any moment of an operation cycle of the plant, at least one of the stations is engaged in operating, idling for cleaning each station, unit or part thereof being provided during said cycle, keeping the plant in nonstop operation.

2. Plant, according to claim 1, characterized in that in addition said plant comprises a reloading unit (50) integrated with said macerating station (20) including means for newly transferring treated meat material from said resting tanks (24) to said rotatory drum (22), so that said trusted material can be submitted to repeated subcycles of massaging-resting before it is fed to the packing station (30).

3. Plant according to claim 1, characterized in that said accumulating and loading unit (40) comprises at least a first hopper (42) and a second hopper (44), carrying-distributing means (46) for alternatively filling said first and second hoppers (42, 44) with injected meat material from the injecting station (10) and transferring means (48) for selectively transferring a load from the first and second hoppers (42, 44) to the rotatory drum (22) of the macerating station.

4. Plant, according to claim 3, characterized in that said transferring means (48) comprise a system of suction ducts driven by a vacuum generated within said rotatory drum (22) or a lifted assembly for directly unloading in a drum access mouth (22).

5. Plant, according to claim 1, characterized in that said transferring and feeding unit (60) includes means for transferring the treated meat material from said resting tanks (24) to a feeding hopper (62) of at least one of a plurality of packing machines (32, 34) of the packing station (30).

6. Plant, according to claim 3, characterized in that said closed path (26) of the resting tanks (24) which are traveling step-by-step include at least a first stopping area under a loading/unloading mouth (23) of the massaging rotary drum (22), a second stopping area close to the transferring and feeding unit (60) and a third stopping area close to said reloading unit (50).

7. Plant, according to claim 5, characterized in that said means for transferring the treated meat material from said resting tanks (24) to said feeding hopper (62) comprise a lifting-tilting apparatus (64) capable to take one of the filled resting tanks (24) from a second stopping area of the path (26) close to the transferring and feeding unit 60, for lifting it, turning its contents down for transferring it to said feeding hopper (62) and bringing it back, empty, to said second stopping area of the path (26).

8. Plant according to claim 6, characterized in that said means for transferring the treated meat material from said resting tanks (24) to said massaging drum (22) comprise a lifting-tilting apparatus (52) capable to take one of the filled resting tanks (24), from said third stopping area of the path (26), lifting it, turn it for transferring its contents down said first hopper (42) of the accumulating and loading unit (40) and bringing it back, empty, to said third stopping area of the path (26).

9. Plant according to claim 1, characterized in that in addition the plant includes an automatic cleaning unit (70) for the resting tanks (24) located at a point of said closed path (26).

10. Plant, according to claim 9, characterized in that said cleaning unit (70) includes means for taking one of said empty resting tanks (24) from a stopping area of the path (26), to transfer it to an automatic cleaning device (72) and bringing it back once it is clean to said stopping area of the path (26).

11. Plant according to claim 1, characterized in that said resting tanks (24) are linked to dragging means for dragging said tanks in closed circuit along said path (26), the tanks (24) being detachable from said dragging means at least in a stopping area.

* * * * *